(12) United States Patent
Brown

(10) Patent No.: US 8,572,349 B2
(45) Date of Patent: Oct. 29, 2013

(54) PROCESSOR WITH PROGRAMMABLE CONFIGURATION OF LOGICAL-TO-PHYSICAL ADDRESS TRANSLATION ON A PER-CLIENT BASIS

(75) Inventor: David A. Brown, Austin, TX (US)

(73) Assignee: Agere Systems LLC, Allentown, PA (US)

( * ) Notice: Subject to any disclaimer, the term of this patent is extended or adjusted under 35 U.S.C. 154(b) by 1222 days.

(21) Appl. No.: 11/343,698

(22) Filed: Jan. 31, 2006

(65) Prior Publication Data

US 2007/0180216 A1   Aug. 2, 2007

(51) Int. Cl.
G06F 12/00 (2006.01)
G06F 13/00 (2006.01)
G06F 13/28 (2006.01)
G06F 15/167 (2006.01)

(52) U.S. Cl.
USPC .......................................... 711/202; 709/214

(58) Field of Classification Search
USPC ........................... 711/202–208; 709/213–214
See application file for complete search history.

(56) References Cited

U.S. PATENT DOCUMENTS

| | | | | |
|---|---|---|---|---|
| 4,285,040 A | * | 8/1981 | Carlson et al. | 711/206 |
| 4,899,272 A | * | 2/1990 | Fung et al. | 365/230.03 |
| 5,179,675 A | * | 1/1993 | Cole et al. | 711/3 |
| 5,623,688 A | * | 4/1997 | Ikeda et al. | 712/28 |
| 6,944,731 B2 | | 9/2005 | Bouchard et al. | |
| 2003/0112801 A1 | | 6/2003 | Calle et al. | |
| 2003/0120621 A1 | | 6/2003 | McDaniel et al. | |
| 2003/0120861 A1 | | 6/2003 | Calle et al. | |
| 2005/0060501 A1 | * | 3/2005 | Shrader et al. | 711/149 |

OTHER PUBLICATIONS

Alex Blanton, Microsoft Computer Dictionary, 2002, Microsoft Press, 5th Ed, p. 445.*

* cited by examiner

Primary Examiner — Ryan Bertram
(74) Attorney, Agent, or Firm — Ryan, Mason & Lewis, LLP

(57) ABSTRACT

A network processor or other type of processor includes translation configuration circuitry which allows programmable configuration of logical-to-physical address translation on a per-client basis for multiple clients of the processor. In one aspect of the invention, the processor stores translation configuration information for a client. A read or write request from the client includes a logical address. The logical address is processed utilizing the stored translation configuration information for the client to generate a physical address. The physical address is utilized to access an internal or external memory.

21 Claims, 4 Drawing Sheets

PROCESSOR WITH PROGRAMMABLE CONFIGURATION OF LOGICAL-TO-PHYSICAL ADDRESS TRANSLATION ON A PER-CLIENT BASIS

FIELD OF THE INVENTION

The present invention relates generally to packet processing systems, and more particularly to a network processor or other type of processor configured for use in performing packet routing, packet switching and other packet processing operations within such a system.

BACKGROUND OF THE INVENTION

A network processor generally controls the flow of packets between a physical transmission medium, such as a physical layer portion of, e.g., an asynchronous transfer mode (ATM) network or synchronous optical network (SONET), and a switch fabric in a router or other type of packet switch. Such routers and switches generally include multiple network processors, e.g., arranged in the form of an array of line or port cards with one or more of the processors associated with each of the cards.

Dynamic random access memories (DRAMs) are a preferred storage technology for use in conjunction with such network processors, in that DRAMs can provide a large storage capacity at limited power consumption. Also, DRAMs are inexpensive compared to other types of storage, such as static random access memories (SRAMs).

DRAMs within or otherwise associated with a network processor are typically arranged in the form of multiple memory banks. Consecutive read or write accesses to an address or addresses within a given one of the banks will require waiting a random cycle time Trc for completion of a required access pre-charge process. However, consecutive accesses to even the same address within different banks do not experience this Trc wait time, which is also referred to herein as the bank conflict penalty.

SRAMs avoid the bank conflict penalty altogether. That is, any address in the memory can be accessed in a fixed time without incurring the Trc wait time associated with DRAMs. However, in addition to being more expensive, their storage capacity is typically an order of magnitude lower, and their power consumption is typically two orders of magnitude higher, relative to comparably-sized DRAMs.

U.S. Pat. No. 6,944,731, issued Sep. 13, 2005 in the name of inventors G. A. Bouchard et al. and entitled "Dynamic Random Access Memory System with Bank Conflict Avoidance Feature," commonly assigned herewith and incorporated by reference herein, discloses an improved DRAM-based memory architecture, for use in conjunction with a network processor or other processing device, which can provide the storage capacity and low power consumption advantages of DRAMs while also providing the advantage of SRAMs in terms of avoiding the problems associated with the above-described bank conflict penalty.

In performing packet processing operations such as routing or switching, the network processor typically must examine at least a portion of the beginning or head of each packet. The amount of each packet that must be examined is dependent upon its associated network communication protocols, enabled options, and other similar factors. The sophistication or complexity of the router or switch can also influence the amount of each packet that will need examination.

Many conventional routers and switches are configured to store, for a given packet being processed, substantially the entire packet, until that packet is finally transmitted to its destination or dropped. The packet is usually stored in a router or switch memory external to the associated network processor. The amount of time the given packet may be kept in external memory is influenced by the basic processing time of the router or switch, the quality of service applied to the packet, the particular protocol layers to be analyzed, and the congestion of the port or other communication channel to which the packet is directed.

High-speed routers and switches will typically store in on-chip memory within the network processor some portion of a given packet being processed by that network processor. This greatly enhances the performance of the router or switch by not requiring it to access the larger external memory holding the entire packet, in that the external memory is slower and more band-limited than the on-chip memory. However, in conventional practice, the worst-case packet portion that may need to be analyzed in a given router or switch application usually dictates the size of every packet portion kept in on-chip memory, even though the worst-case packet portion may be associated with only certain rarely-occurring packets. This significantly increases the required size of the on-chip memory, and thus the cost and complexity of the network processor.

U.S. Patent Application Publication No. 2003/0112801, entitled "Processor with Reduced Memory Requirements for High-Speed Routing and Switching of Packets," commonly assigned herewith and incorporated by reference herein, discloses improved techniques for determining particular portions of packets to be stored in particular memories associated with a network processor or other type of processor, so as to reduce the memory requirements of the device.

Despite the above-noted advancements, a need remains for further improvements in network processors. More particularly, conventional processors are inflexible in terms of the manner in which they translate logical addresses to physical addresses, and therefore may not provide optimal memory bandwidth and memory usage.

In one conventional approach, a given physical memory is not shared by multiple clients, but is instead assigned in its entirety to a single client. A "client" in this context refers to a network processor logic entity or other hardware or software entity that requires access to physical memory. The physical memory may comprise, for example, a multi-bank memory comprising a plurality of banks, with each bank having a plurality of pages. A read or write request issued by the client specifies a logical address. A rigid address translation is performed where the logical address presented by the client is mapped to a physical address for the multi-bank memory. The physical address includes a bank address portion and a page address portion. The mapping of logical address to physical address uses bits in the logical address to determine the bank address of the multi-bank memory. The page address portion of the physical address is given by the logical address less the bits that were utilized for the bank address.

Other conventional approaches allow physical memory to be shared by multiple clients, typically using either vertical striping or horizontal striping. Vertical striping refers to an arrangement in which each client is assigned one or more banks of a multi-bank memory, while in horizontal striping each client is assigned a range of pages across all banks of a multi-bank memory. However, these approaches also involve performing a rigid translation of logical address to physical address.

The rigid address translation requirements of the conventional approaches described above can make the processor inefficient in certain applications. For example, the address translation is not programmable on a client-by-client basis, nor does it provide the memory controller with information which could be used to optimize memory bandwidth.

Accordingly, improved address translation techniques are needed which overcome the above-noted deficiencies.

SUMMARY OF THE INVENTION

The invention in an illustrative embodiment provides a network processor in which the type of logical-to-physical address translation performed for a given client of the processor is determined by translation logic based on the contents of a programmable translation configuration register assigned to that client.

In accordance with an aspect of the invention, a network processor or other type of processor includes at least one hardware or software entity referred to as a client; translation configuration circuitry storing translation configuration information for the client; address translation circuitry coupled to the translation configuration circuitry, the address translation circuitry being configured to utilize the translation configuration information to generate a physical address from a logical address specified in a request from the corresponding client; and memory controller circuitry coupled to the address translation circuitry, the memory controller circuitry being configured to access a memory utilizing the physical address.

The client may be, for example, a segmentation engine, a classification engine, a buffer controller or other processing element of the processor. Additional examples of possible clients include a general purpose processing core, a queuing engine, a traffic shaper, a traffic scheduler, a link list controller, a policing engine, a statistics engine, etc.

In the illustrative embodiment, the translation configuration circuitry comprises a plurality of translation configuration registers associated with respective ones of a plurality of clients of the processor. A given one of the translation configuration registers may store information specifying a particular number of banks of a multiple-bank memory that are allocated to a corresponding client. Such a register may also store information specifying which of the number of banks allocated to the corresponding client are to be used for an associated transfer. Other types of information that may be stored in a given translation configuration register include, for example, information specifying one or more bits of a logical address that are to be used to determine a bank portion of the physical address.

The address translation circuitry may comprise logical-to-physical address translation logic configured to perform at least first and second different types of address translation. Selection of a given one of the different types of address translation for use with the logical address specified in the request from the client is based on the translation configuration information stored for the client in the translation configuration circuitry.

Advantageously, the techniques of the invention avoid the need to perform rigid translations of logical address to physical address, and thereby facilitate the sharing of multi-bank memories between clients of a processor. The address translation is programmable on a per-client basis, and provides the memory controller with information which improves memory usage and bandwidth, thereby increasing processor throughput.

DETAILED DESCRIPTION OF THE INVENTION

The invention will be illustrated herein in conjunction with an exemplary packet processing system which includes a network processor configured in a particular manner. It should be understood, however, that the invention is more generally applicable to any processor in which it is desirable to provide a more flexible address translation approach.

A "processor" as the term is used herein may be implemented, by way of example and without limitation, utilizing a microprocessor, central processing unit (CPU), digital signal processor (DSP), application-specific integrated circuit (ASIC), or other type of data processing device, as well as portions and combinations of these and other devices.

The present invention in an illustrative embodiment provides an improved address translation approach in which separate translation configuration information is stored for respective clients of the network processor. As noted above, a "client" in this context refers to a processor logic entity or other hardware or software entity that requires access to physical memory, which may be, for example, an internal or external multi-bank memory comprising a plurality of banks, with each bank having a plurality of pages. Conventional approaches to address translation in shared memory arrangements typically involve performing a rigid translation of logical address to physical address. The illustrative embodiment overcomes this problem, and provides address translation that is programmable on a client-by-client basis, and that provides a memory controller with information which can be used to optimize memory bandwidth.

Figure 1:
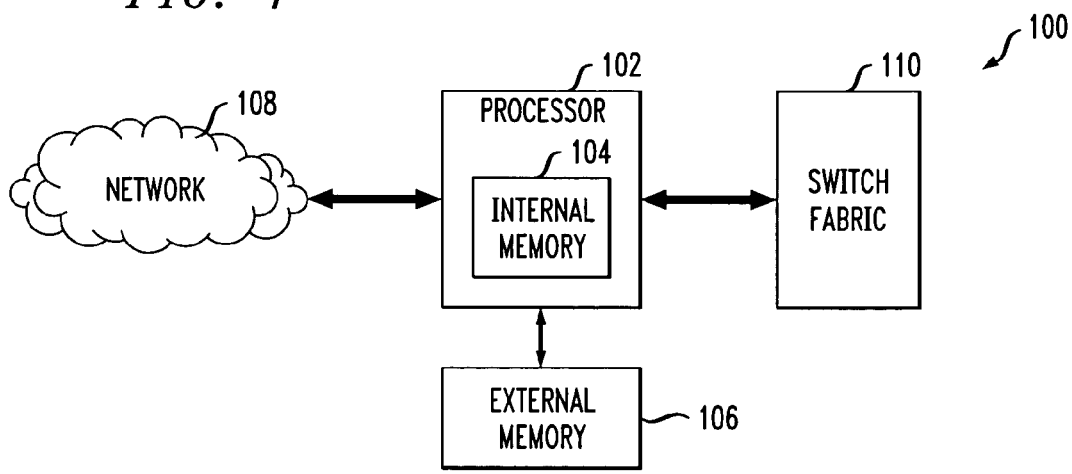
FIG. 1 is a simplified block diagram of a packet processing system in which the present invention is implemented.

FIG. 1 shows a packet processing system 100 in which the invention is implemented. The system 100 includes a network processor 102 having an internal memory 104. The network processor 102 is coupled to an external memory 106 as shown, and is configured to provide an interface between a network 108 from which packets are received and a switch fabric 110 which controls switching of packet data. The processor 102 and its associated external memory 106 may be implemented, e.g., as one or more integrated circuits installed on a line card of a router or switch, as will be described in conjunction with FIG. 5. In such a configuration, the switch fabric 110 is generally considered to be a part of the router or switch.

Although the memory 106 is shown in the figure as being external to the processor 102, the term "processor" as used herein is intended to be sufficiently broad to encompass elements 102 and 106.

It should be understood that the particular arrangement of system elements shown in FIG. 1 is by way of illustrative example only. For example, as previously noted, the invention can be implemented in any type of processor, and is not limited to any particular packet processing application.

Figure 2:
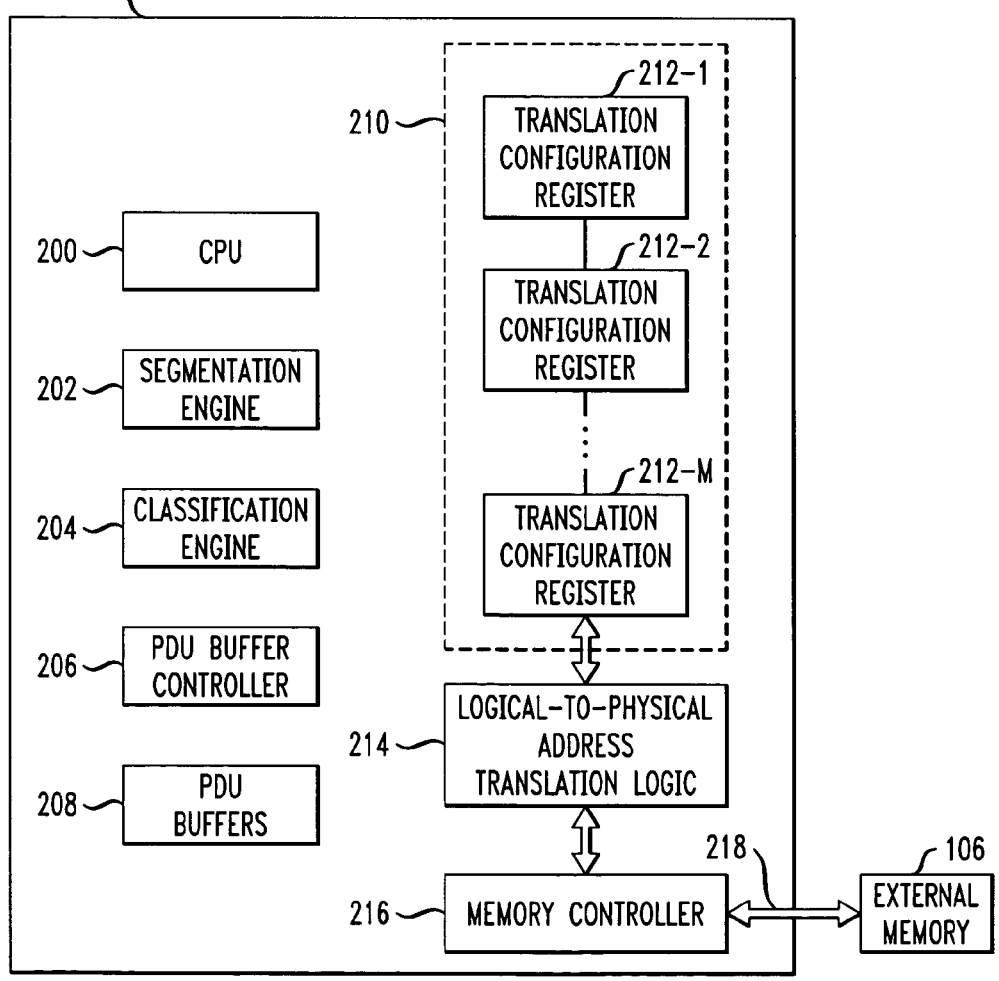
FIG. 2 is a more detailed view of a network processor of the FIG. 1 system configured in accordance with the techniques of the invention.

FIG. 2 shows the network processor 102 of FIG. 1 in greater detail. The processor 102 in this embodiment includes a CPU 200 and a plurality of clients including segmentation engine 202 and classification engine 204. Also included in the processor 102 are a protocol data unit (PDU) buffer controller 206 and a set of PDU buffers 208. The processor 102 may also include or otherwise have associated therewith other processing circuitry not shown in the figure, such as a traffic shaper, traffic scheduler, or other type of traffic manager. The conventional aspects of the operation of common network processor elements such as 200, 202, 204, 206 and 208 are well understood in the art and therefore not described in detail herein.

It is to be appreciated that the particular clients shown in the figure are by way of example only. Any type of processing element of the network processor 102, or portions of such processing elements, may be clients for which programmable configuration of logical-to-physical address translation is provided on a per-client basis. Additional examples of possible clients include a general purpose processing core, such as CPU 200, a queuing engine, a traffic shaper, traffic scheduler or other type of traffic manager, a link list controller, a policing engine, a statistics engine, etc.

Translation configuration registers 210 are associated with respective ones of a plurality of clients of the processor. The translation configuration registers may be viewed as an example of what is more generally referred to herein as "translation configuration circuitry." In this embodiment, there are a total of M translation configuration registers, individually denoted 212-1, 212-2, . . . 212-M, with each register generally being associated with a corresponding client of the processor 102. That is, one of the registers, such as register 212-1, may be associated with segmentation engine 202, while another of the registers, such as register 212-2, may be associated with classification engine 204. The actual value of the number M is arbitrary, and can be readily determined based on the particular needs of a given implementation. It is important to note in this regard that a wide variety of different entities of the processor 102 can be designated as clients for which translation configuration information is stored in respective ones of the registers 210. For example, PDU buffer controller 206 may be designated as a client, and may be assigned one of the translation configuration registers 210.

As will be described in greater detail below, a given translation configuration register stores translation configuration information for its associated client. The particular stored translation configuration information, as well as which of the translation configuration registers are associated with which clients, is dynamically programmable on a client-by-client basis under the control of a processing unit, such as CPU 200. This programmability feature may also or alternatively be provided using a host processor that is external to the processor 102, and coupled thereto via an interface bus or other suitable interconnection.

The processor 102 further includes logical-to-physical address translation logic 214, and a memory controller 216 which communicates via interface 218 with external memory 106. As indicated above, external memory 106 may comprise a multi-bank memory, each bank of which comprises a plurality of pages, although the invention does not require this or any other particular internal or external memory configuration. Although shown as a single memory controller, the memory controller 216 may include separate controllers for each of the internal memory 104 and the external memory 106, as will be appreciated by those skilled in the art. The logical-to-physical address translation logic 214 and memory controller 216 may be viewed as examples of what are more generally referred to herein as "address translation circuitry" and "memory controller circuitry," respectively.

As shown in the figure, the translation logic 214 is coupled to the translation configuration registers 210 and the memory controller 216. For a given client request, which may be a read request, a write request or other type of data transfer request, the translation logic obtains the translation configuration information for the corresponding client from its associated one of the configuration registers 210. The translation logic utilizes this information to generate a physical address from a logical address specified in the client request. Other information, such as a number of native size transfers and page control information, may also be generated. The page control information may comprise, for example, information indicating whether a particular page or pages should be kept open or should be closed. The memory controller 216 receives the physical address and other information, if any, from the translation logic 214 and accesses the memory 106 accordingly.

An advantage of this approach is that different types of address translation can be performed for different types of processor clients, thereby providing more efficient memory usage and enhanced memory bandwidth. For example, in an arrangement involving two distinct clients, the translation logic may be configured to perform at least first and second different types of address translation. Selection of a given one of the different types of address translation for use with the logical address specified in a request from one of the clients is based on the translation configuration information stored for that client in its associated one of the translation configuration registers. Numerous types of address translation are known in the art, as well as the associated signaling between translation element, memory controller and memory, and accordingly such details are not further described herein.

Figure 3:
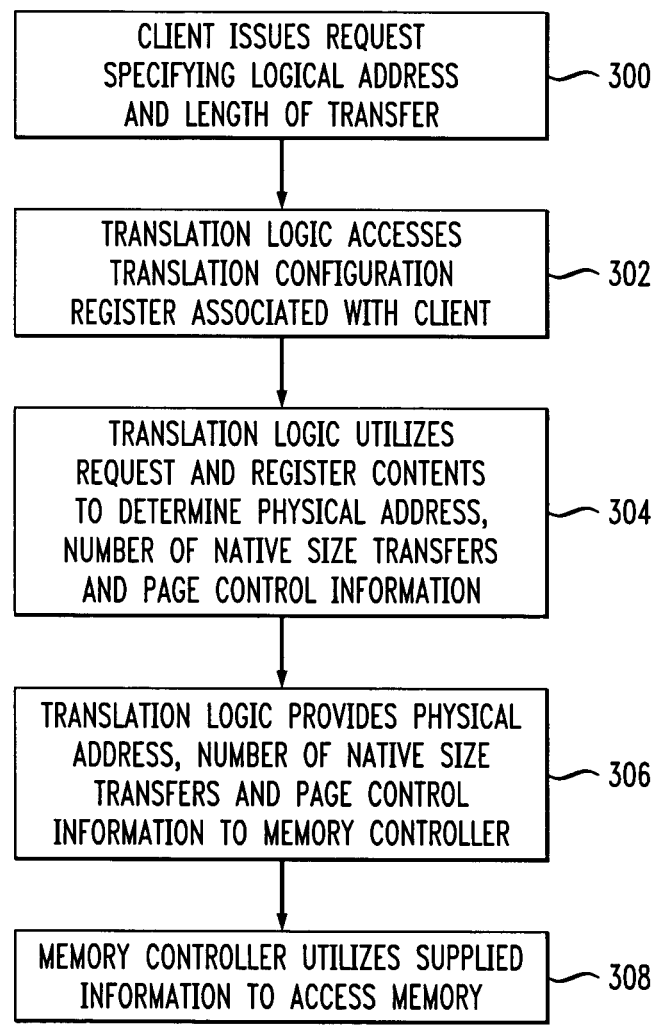
FIG. 3 is a flow diagram of an address translation process that is implementable in the FIG. 1 system by the FIG. 2 network processor in accordance with the invention.

FIG. 3 is a flow diagram illustrating the processing of a given client request in the network processor 102 of FIG. 2. The process includes steps 300 through 308.

In step 300, the client issues a request specifying a logical address and a length of transfer. As noted previously, the client may be, for example, segmentation engine 202 or classification engine 204, or any other hardware or software entity of processor 102 which requires access to memory. The memory in this example is assumed to be a multi-bank memory with each bank comprising multiple pages. The client request, which as noted above may be a read request, a write request or some other type of data transfer request, specifies at least a logical address and a length of the corresponding data transfer. In step 302, the translation logic 214 accesses the particular one of the translation configuration registers 210 that is associated with the client making the request. For example, the translation configuration register may specify which bit or bits of the logical address are to be used to determine the bank portion of the physical address. More particularly, in a four-bank embodiment, 0, 1 or 2 logical address bits may be used to determine the bank portion of the physical address. Of course, for embodiments involving a larger number of banks, more bits could be used. As another example, if the client is to be restricted to a single bank, the translation configuration register of that client may provide information indicating the particular bank to which the client is restricted.

In step 304, the translation logic 214 utilizes the client request and the contents of the translation configuration register assigned to the client to determine a physical address as well as additional information if needed. This additional information may include, for example, a number of native size transfers corresponding to the transfer length specified in the client request, and page control information. Thus, if a client request received by the translation logic is greater than the native transfer size of the interface 218, the translation logic may separate the request into N transfers each of the native transfer size.

It should be noted that a given client request could result in multiple native transfer requests, some in one page and some in one or more other pages. Thus, for such a client request, there could be a particular number N1 of native size transfers for page 1, a particular number N2 of native size transfers for page 2, and so on.

The native transfer size may be, for example, four times the bus width of the interface 218, based on a DDR burst size of four. The burst size in DDR implementations may be two, four or higher values, and the native transfer size may be adjusted accordingly.

For at least a subset of the N transfers, the translation logic may generate page control information. In one embodiment, the page control information may comprise what is referred to herein as an "atomic" bit, indicating that a given page should be kept open to facilitate multiple requests to the same page. The atomic bit having a particular value may indicate, for example, that if a given page is not open it should be opened and kept open, or if a given page is open, it should be closed after the current request. Numerous alternative types of single-bit or multi-bit page control information may be used in a given embodiment.

In step 306, the translation logic 214 provides the physical address, number of native size transfers and page control information to the memory controller 216.

In step 308, the memory controller utilizes the supplied information, including the physical address, number of native size transfers and page control information, to access the external memory 106.

Figure 4:
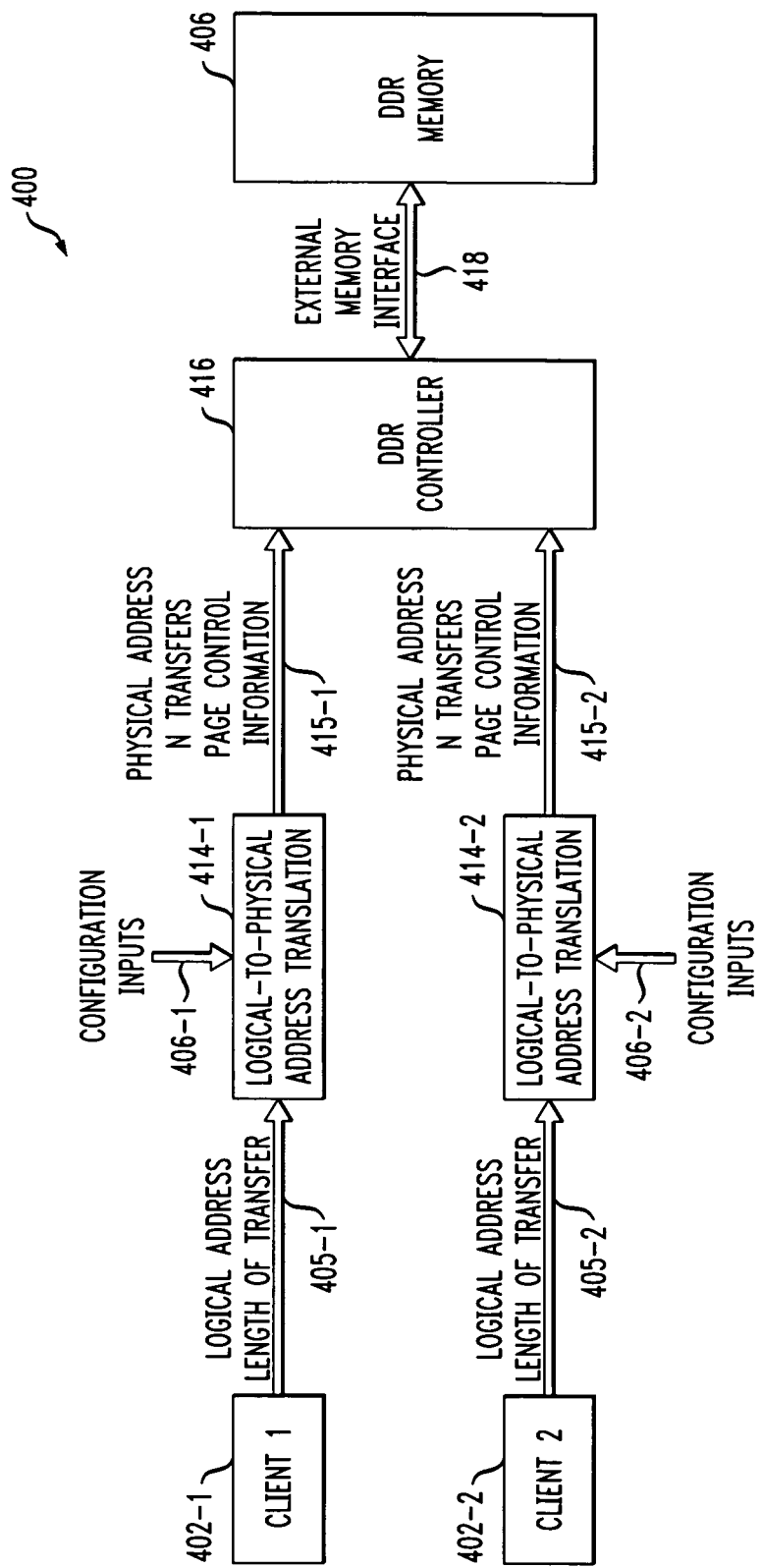
FIG. 4 is a diagram illustrating the operation of a network processor having multiple clients and configured in a manner similar to the FIG. 2 network processor.

FIG. 4 illustrates the process flow described above for the case of a network processor 400 comprising two clients denoted Client 1 and Client 2, corresponding to reference numerals 402-1 and 402-2, respectively. The network processor 400 is assumed to be generally configured in the manner described in conjunction with FIG. 2. Client requests 405-1 and 405-2 are supplied along with respective configuration inputs 406-1 and 406-2 to respective translation processes 414-1 and 414-2 implemented in address translation logic. The configuration inputs 406-1 and 406-2 may be obtained or otherwise received by the translation logic from respective ones of the translation configuration registers 210.

The translation processes 414-1 and 414-2 generate for respective ones of the client requests a corresponding physical address, a number N of native size transfers, and page control information, as shown at 415-1 and 415-2. These inputs are supplied to a memory controller 416, which in this embodiment is a double data rate (DDR) controller coupled via external memory interface 418 to an external DDR memory 406. The DDR controller may comprise elements typically found in a conventional implementation of such an element. For example, the DDR controller may comprise an arbiter that is used to arbitrate multiple requests that arrive simultaneously. Such an arbiter in an embodiment of the present invention may be configured to utilize the number of native size transfers and the associated page control information provided by the translation processes 414-1 and 414-2 in order to optimize memory bandwidth or other performance measures.

It should be noted that a given embodiment of the invention may use horizontal striping or vertical striping arrangements in sharing memory among the various clients. For example, in a horizontal striping arrangement, one client may be assigned the lower half of a number of banks of memory, with another client getting the rest of the memory. In this and other similar arrangements, offset information could be used to segment the memory on a per-client basis.

An example of a translation configuration register format suitable for use with the illustrative embodiments is presented in TABLE 1 below. In this example, it is assumed that a given register comprises at least eleven bits, denoted as bits 10:0. Also, the external memory is assumed to be a four-bank memory. It can be seen that the format shown permits either two or four of the four banks to be allocated to a given client. The format further permits the width of the DDR memory to be selected as 16 bits wide or 32 bits wide, again on a per-client basis. Of course, this particular translation configuration register format is presented by way of illustrative example only, and numerous alternative formats may be used.

TABLE 1

Translation Configuration Register Format

| bit | name/description |
|---|---|
| 10 | ddr_is_16<br>Configures the memory to be 16 bits wide:<br>0 = memory interface is 32 bits wide<br>1 = memory interface is 16 bits wide |
| 9:8 | bank_count<br>Number of banks allocated to the client:<br>00 = use 4 banks<br>01 = use 1 bank<br>10 = use 2 banks (default)<br>11 = reserved |
| 7:6 | bank_to_use_1<br>Second of two banks to use when the client's bank count is 2. |
| 5:4 | bank_to_use_0<br>Bank to use when the client's bank count is 1, or the first of two banks to use when the client's bank count is 2. |
| 3:0 | bank_base_address<br>What bits in the 16-byte logical address should be used to determine the bank address portion of the physical address:<br>0000 = use byte address bit 4<br>0001 = use byte address bit 5<br>0010 = use byte address bit 6<br>. . .<br>1110 = use byte address bit 18<br>1111 = use byte address bit 19 |

Figure 5:
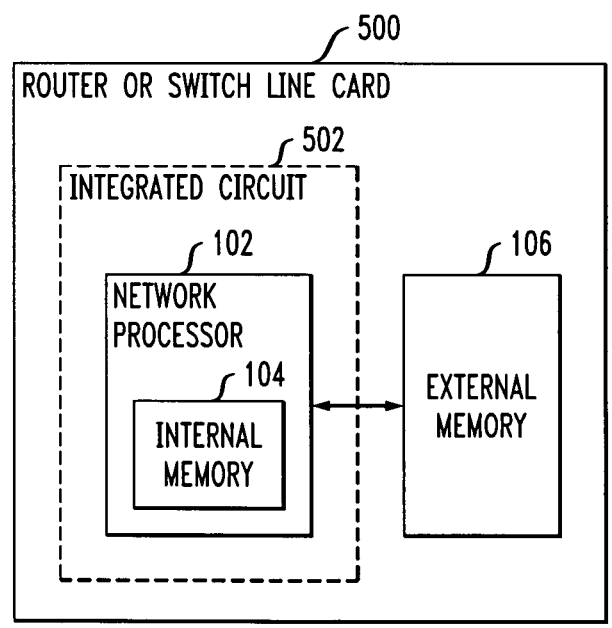
FIG. 5 illustrates the manner in which a network processor can be implemented in the form of an integrated circuit installed on a line card of a router or switch.

As noted above, the network processor 102 may be implemented as an integrated circuit installed on a line card of a router or switch. An arrangement of this type is shown in FIG. 5. In this embodiment, a line card 500 has an integrated circuit 502 installed thereon. The integrated circuit 502 comprises network processor 102 having internal memory 104. The network processor 102 interacts with external memory 106 on the line card 500. The line card 500 as shown in FIG. 5 is considerably simplified for clarity of illustration. It is to be appreciated, however, that such a card may comprise multiple integrated circuits, including, for example, an external host processor of the type noted above, suitable for programming the translation configuration registers 210 on a per-client basis. Similar implementations of the invention may be based on one or more port cards of a router or switch.

It is apparent from the foregoing that a given embodiment of the present invention may comprise one or more integrated circuits. In such an arrangement, a plurality of identical die is typically formed in a repeated pattern on a surface of a semiconductor wafer. Each die may include a variety of structures or circuits. The individual die are cut or diced from the wafer, then packaged as an integrated circuit. One skilled in the art would know how to dice wafers and package die to produce integrated circuits. Integrated circuits so manufactured are considered part of this invention.

The above-described embodiments of the invention are intended to be illustrative only. For example, although the illustrative embodiments utilize translation configuration registers associated with respective clients, other types of translation configuration circuitry may be used, such as a single register that stores address translation configuration information for two or more clients, or multiple registers that collectively store address translation configuration information for a single client. Also, clients for which configurable address translation is provided within a given processor can be of any type. The assignment of configuration registers to clients can be fixed or variable, as appropriate to the particular needs of a given implementation. These and numerous other alternative embodiments within the scope of the following claims will be apparent to those skilled in the art.

What is claimed is:

1. A processor comprising:
   a plurality of clients;
   translation configuration circuitry comprising a plurality of translation configuration registers, a given one of the plurality of translation configuration registers storing translation configuration information for at least a given one of the plurality of clients;
   address translation circuitry coupled to the translation configuration circuitry, the address translation circuitry being configured to utilize the translation configuration information for the given client to generate a physical address from a logical address specified in a request from the given client; and
   memory controller circuitry coupled to the address translation circuitry, the memory controller circuitry being configured to access a memory utilizing the physical address;
   wherein the given one of the translation configuration registers comprises at least a first portion and a second portion, the first and second portions specifying respective first and second sets of bit locations of the logical address that are to be used to determine respective first and second portions of translation logic for the given client.

2. The processor of claim 1 wherein the plurality of clients comprises at least one of a segmentation engine, a classification engine, a protocol data unit buffer controller, a general-purpose processing core, a queuing engine, a traffic manager and a link list controller.

3. The processor of claim 1 wherein the given one of the translation configuration registers stores information specifying a particular number of banks of a multiple-bank memory that are allocated to the given client.

4. The processor of claim 3 wherein the given one of the translation configuration registers stores information specifying which of the number of banks allocated to the given client are to be used for an associated transfer.

5. The processor of claim 1 wherein the given one of the translation configuration registers stores information specifying one or more bits of a logical address that are to be used to determine a bank portion of the physical address.

6. The processor of claim 1 wherein the address translation circuitry comprises logical-to-physical address translation logic.

7. The processor of claim 1 wherein the memory comprises an external memory coupled to the memory controller via an external memory interface of the processor.

8. The processor of claim 1 wherein the memory comprises an internal memory of the processor.

9. The processor of claim 1 wherein the client request further specifies a length of a corresponding data transfer.

10. The processor of claim 9 wherein the address translation circuitry determines a number of native size transfers corresponding to the transfer length specified in the client request.

11. The processor of claim 1 wherein the address translation circuitry processes the client request to determine page control information suitable for delivery to the memory controller.

12. The processor of claim 1 wherein the configuration information stored in the translation configuration circuitry is updatable under control of a processing unit.

13. The processor of claim 1 wherein the processor comprises a network processor.

14. The processor of claim 1 wherein the processor is configured as an integrated circuit.

15. The processor of claim 1, wherein the first and second portions of the given one of the translation configuration registers for the given client are different than first and second portions of at least another one of the plurality of configuration registers associated with another one of the plurality of clients.

16. The processor of claim 1, wherein the first portion of translation logic specifies a width of the memory interface.

17. The processor of claim 16, wherein the second portion of translation logic specifies a bank portion of the physical address.

18. The processor of claim 17, wherein the given one of the translation configuration registers further comprises third and fourth portions specifying respective third and fourth sets of bit locations of the logical address that are to be used to determine respective third and fourth portions of translation logic, the third portion of translation logic specifying a particular number of banks of a multiple-bank memory allocated to the given client and the fourth portion of translation logic specifying which of the number of banks allocated to the given client are to be used for an associated transfer.

19. A processing system comprising:
   a processor; and
   an external memory operatively coupled to the processor;
   the processor further comprising:
      a plurality of clients;
      translation configuration circuitry comprising a plurality of translation configuration registers, a given one of the plurality of translation configuration registers storing translation configuration information for at least a given one of the plurality of clients;
      address translation circuitry coupled to the translation configuration circuitry, the address translation circuitry being configured to utilize the translation configuration information for the given client to generate a physical address from a logical address specified in a request from the given client; and
      memory controller circuitry coupled to the address translation circuitry, the memory controller circuitry being configured to access a memory utilizing the physical address;
   wherein the given one of the translation configuration registers comprises at least a first portion and a second portion, the first and second portions specifying respective first and second sets of bit locations of the logical address that are to be used to determine respective first and second portions of translation logic for the given client.

20. A method for use in processing packets in a processor, the processor comprising a plurality of clients, the method comprising the steps of:

storing translation configuration information for the plurality of clients of the processor in a plurality of translation configuration registers, a given one of the plurality of translation configuration registers storing translation configuration information for at least a given one of the plurality of clients;

utilizing the translation configuration information for the given client to generate a physical address from a logical address specified in a request from the given client; and accessing a memory utilizing the received physical address;

wherein the given one of the translation configuration registers comprises at least a first portion and a second portion, the first and second portions specifying respective first and second sets of bit locations of the logical address that are to be used to determine respective first and second portions of translation logic for the given client.

21. The method of claim 20 wherein the given one of the translation configuration registers stores information specifying one or more bits of the logical address that are to be used to determine the bank portion of a physical address.

* * * * *